United States Patent [19]

Thuries et al.

[11] Patent Number: 5,396,393
[45] Date of Patent: Mar. 7, 1995

[54] PUMPING STATION

[75] Inventors: Edmond Thuries, Meyzieu; Martin Motz, Villeurbanne, both of France

[73] Assignee: GEC Alsthom SA, Paris, France

[21] Appl. No.: 13,733

[22] Filed: Feb. 4, 1993

[30] Foreign Application Priority Data

| Feb. 7, 1992 | [FR] | France | 92 01403 |
| Aug. 7, 1992 | [FR] | France | 92 09836 |
| Dec. 14, 1992 | [FR] | France | 92 15018 |

[51] Int. Cl.$^6$ .............................................. H02J 3/40
[52] U.S. Cl. ............................................ 361/10; 361/2; 361/58
[58] Field of Search ...................... 361/2–14, 361/17, 20, 21, 35, 36, 38, 42, 45, 56, 58, 61, 62, 78, 79, 88, 89, 93, 94, 97, 102, 109, 111, 114, 115, 116, 126, 127, 131–138

[56] References Cited

U.S. PATENT DOCUMENTS

| 3,641,357 | 2/1972 | Gratzmuller | 361/10 |
| 3,935,509 | 1/1976 | Eidinger | 361/10 |
| 4,470,091 | 9/1984 | Sun et al. | 361/20 |
| 4,733,319 | 3/1988 | Yoshida et al. | 361/58 |
| 5,124,872 | 6/1992 | Pham et al. | 361/11 |

OTHER PUBLICATIONS

Electra, No. 94, May 1984, pp. 15–33, H. Kan "Problems Related to Cores of Transformers and Reactors".
Power Engineering, Jul. 1964, pp. 28–32, John Pett: "How to evaluate pumped storage for peaking generation".

Primary Examiner—Jeffrey A. Gaffin
Assistant Examiner—Ronald W. Leja
Attorney, Agent, or Firm—Sughrue, Mion, Zinn, Macpeak & Seas

[57] ABSTRACT

A pumping station feeds hydraulic energy to a grid or raises water from a low level to a high level. It includes, in particular, a transformer connected between an alternator and a grid, with a circuit breaker between the transformer and the grid. It further includes resistance for limiting the surge current through the transformer. This resistance lies in the range of 500 ohms to 100,000 ohms and is inserted for a period lying in the range 15 milliseconds to 19 milliseconds when the circuit breaker is closed, and a controller for ensuring that the circuit breaker closes on the unloaded transformer only at an instant that is no more than 1.2 milliseconds from an extreme value in the grid voltage.

3 Claims, 10 Drawing Sheets

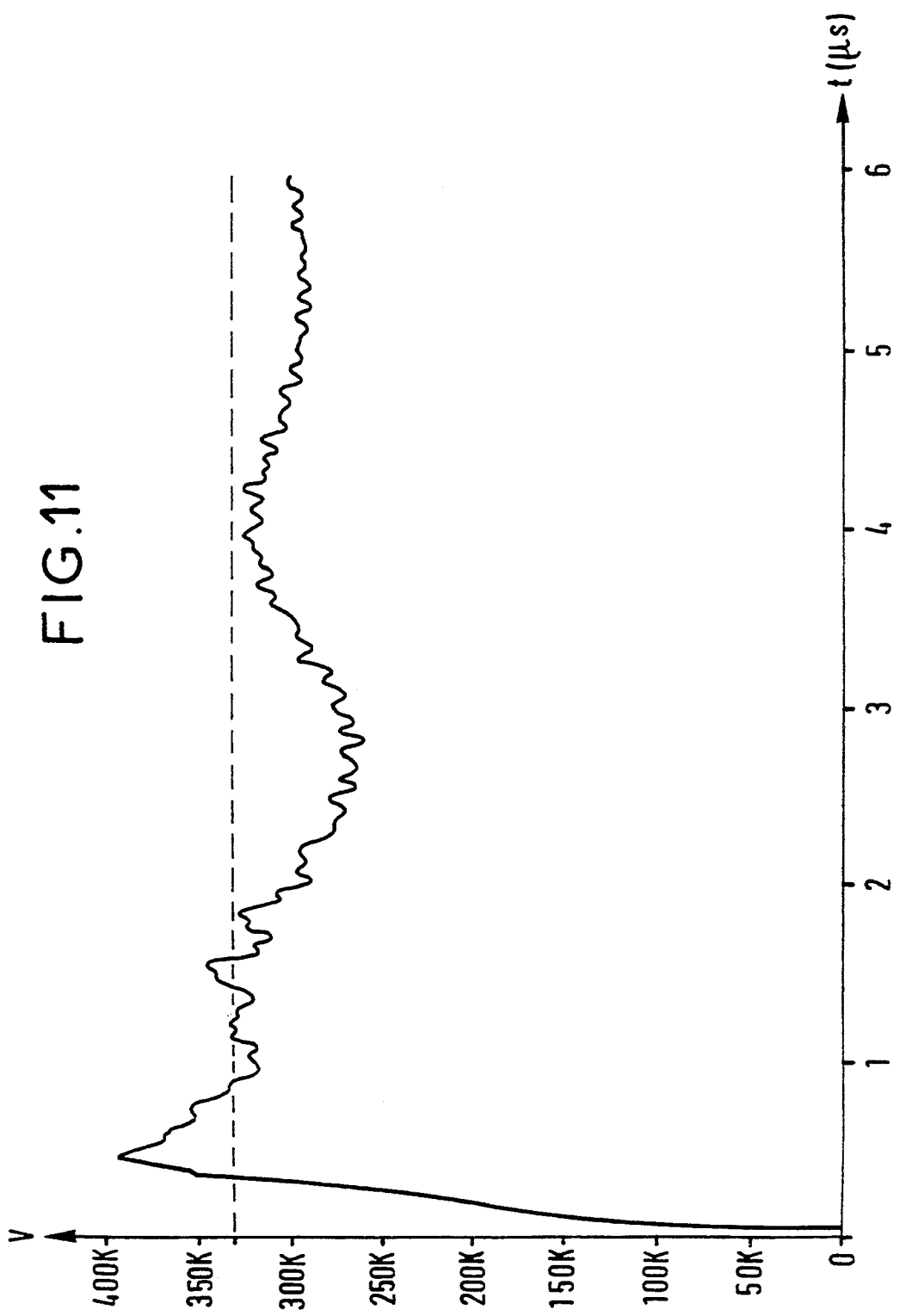

PUMPING STATION

The present invention relates to a pumping station that operates from time to time as a producer of electrical energy, and form time to time as a consumer of energy.

BACKGROUND OF THE INVENTION

When producing energy, water flowing from a higher level to a lower level drives a hydraulic turbine is coupled to an alternator that delivers energy to an electricity grid via a very high tension/medium tension transformer (abbreviated below as a VHT/MT transformer), serving to raise voltage. When consuming energy, the grid delivers electrical energy to a motor through the same voltage transformer, and the motor drives a pump that raises the water to the higher level. The machines are excited by means of static thyristor generators fed via medium tension/low tension transformers (abbreviated to MT/LT) which are connected to the VHT/MT transformer and which are therefore called take-off transformers. The pumping station is connected to the grid by means of a circuit breaker.

Before starting any machine, motor or alternator depending on the selected mode of operation, it is necessary to put the VHT/MT transformer under tension so as to enable it to feed the take-off transformer corresponding to the machine that is to be used.

Because of the low power of the take-off transformer, this takes place as though the VHT/MT transformer were put under tension while unloaded.

Putting an unloaded transformer under tension gives rise to a surge current whose peak value depends on the voltage value at the instant of connection. If connection takes place while the alternating voltage is passing through an extreme value, then the surge current is low, whereas if connection takes place when the grid voltage is in the vicinity of zero, then the surge current may reach high values, of the order of five times to ten times the nominal current of the transformer. Such an overload has the effect of fatiguing the transformer because of the electromagnetic forces generated and also accelerates the aging of the insulation. Such insulation aging can be further accelerated if parallel ferro-resonant phenomena occur.

Unfortunately, the transformer of a pumping station may be switched several times a day, such that unless it is very considerably overdimensioned, it is subjected to rapid degradation.

An object of the invention is to provide a pumping station with means for limiting the surge current in its transformer at the moment it is engaged.

Proposals have been made, in particular in the journal Electra, No. 94, May 1984, in an article entitled "Problems relating to the magnetic circuits of transformers and of reaction coils" by H. Kan, to provide the circuit breaker with means for inserting a resistance of 4,300 ohms in parallel with its contacts for a period of 25 milliseconds on closing, or a resistance lying in the range 3,000 ohms to 7,000 ohms for a period of not less than 13 milliseconds.

The Applicant has observed that the insertion time is an essential parameter in implementing this technique. If the insertion time is too short, then the current is insufficiently clipped; if the duration is too long, then the energy absorbed by the resistance is too great and may lead to rapid destruction thereof.

According to a characteristic of the invention, the resistance of the insertion resistor lies in the range 500 ohms to 100,000 ohms, and the insertion duration lies in the range 15 milliseconds to 19 milliseconds.

Another way of limiting the surge current in a pumping station is based on the observation that the surge current is smaller the nearer the grid voltage is to an extreme value at the instant when the transformer is engaged.

According to the invention, the pumping station includes means acting on the control of the circuit breaker to allow it to close on the unloaded transformer only at an instant that is not more than 1.2 milliseconds on either side of the instant at which the grid voltage passes through an extreme value. This technique can be used on its own or in combination with the preceding technique.

By using this technique, the current through the transformer need not exceed twice the nominal current of the transformer, as has been shown by calculations performed by the Applicant.

When applying this solution, the voltage wave applied to the transformer is at a maximum. Large amplitude oscillations at a frequency of several MHz and having steep wave fronts appear in the metal-clad station and this is harmful to the transformer. According to a characteristic of the invention, to avoid this drawback, each of the phase conductors connecting the transformer to the circuit breaker is grounded through a circuit including a capacitor and a resistor in series. In a metal-clad configuration where the capacitor and the resistor are placed in a metal tube, the resistance of the resistor should be equal to the characteristic impedance of said tube. The capacitance of the capacitor should be not less than 2 nanoFarads.

SUMMARY OF THE INVENTION

The invention provides a pumping station that operates from time to time as a producer of energy by the action of a turbine driven by water falling from a higher level to a lower level, said turbine being coupled to an alternator connected to an electricity grid via a very high tension/medium tension transformer in series with a high tension circuit breaker, and from time to time as a consumer of energy raising water from the lower level to the higher level by means of a pump driven by an electric motor fed from said grid via said transformer, said high tension circuit breaker being disposed downstream from the transformer and being fitted with a device for inserting a resistor on closing, wherein the resistance of the resistor lies in the range 500 ohms to 100,000 ohms, and the duration for which said resistor is inserted on closing of the circuit breaker lies in the range 15 milliseconds to 19 milliseconds.

The invention also provides a pumping station that operates from time to time as a producer of energy by the action of a turbine driven by water falling from a higher level to a lower level, said turbine being coupled to an alternator connected to an electricity grid via a very high tension/medium tension transformer in series with a high tension circuit breaker, and from time to time as a consumer of energy raising water from the lower level to the higher level by means of a pump driven by an electric motor fed from said grid via said transformer, said high tension circuit breaker being disposed downstream from the transformer and being fitted with a device for inserting a resistor on closing, wherein the station includes means acting on the control of the circuit breaker to allow it to close only at an instant that is not more than 1.2 milliseconds on either side of the instant at which the grid voltage passes through an extreme value.

The invention also provides a pumping station that operates from time to time as a producer of energy by the action of a turbine driven by water falling from a higher level to a lower level, said turbine being coupled to an alternator connected to an electricity grid via a very high tension/medium tension transformer in series with a high tension circuit breaker, and from time to time as a consumer of energy raising water from the lower level to the higher level by means of a pump driven by an electric motor fed from said grid via said transformer, said high tension circuit breaker being disposed downstream from the transformer and being fitted with a device for inserting a resistor on closing, wherein the resistance of the resistor lies in the range 500 ohms to 100,000 ohms, and the duration for which said resistor is inserted on closing of the circuit breaker lies in the range 15 milliseconds to 19 milliseconds, and wherein the station includes means acting on the control of the circuit breaker to allow it to close only at an instant that is not more than 1.2 milliseconds on either side of the instant that the grid voltage passes through an extreme value, each of the phase conductors connecting the transformer to the circuit breaker being connected to ground via a circuit comprising a capacitor and a resistor in series.

Advantageously, each of the phase conductors connecting the transformer to the circuit breaker is grounded via a circuit comprising a capacitor and a resistor in series.

The capacitance of the capacitor is not less than 2 nanoFarads.

In a particular embodiment, the capacitor and the resistor are cylindrical components disposed coaxially inside a grounded metal tube filled with a gas having good dielectric properties.

The resistance of the resistor is then close to the characteristic impedance of said tube.

BRIEF DESCRIPTION OF THE DRAWINGS

The invention is described in greater detail below with reference to the accompanying drawings, in which:

FIG. 11 is a graph showing the voltage across the terminals of the same transformer when the pumping station is provided with the resistor and capacitor circuit.

MORE DETAILED DESCRIPTION

Figure 1:
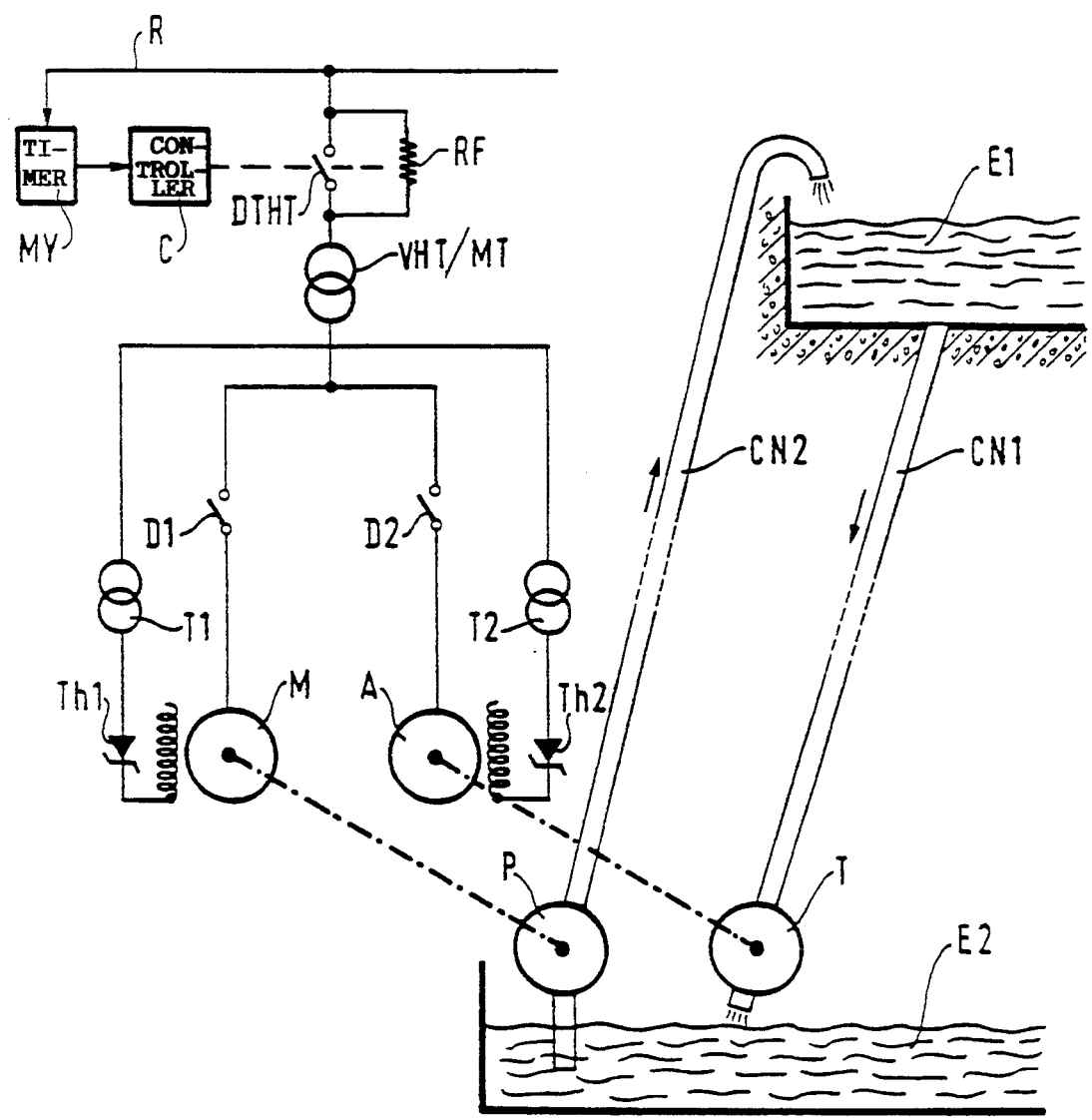
FIG. 1 is a diagram of a pumping station.

In FIG. 1, reference E1 designates a water reservoir at a higher level feeding, via a conduit CN1, a hydraulic turbine T placed close to a reservoir E2 at a lower level. The turbine is coupled to an alternator that feeds a grid R via a very high tension/medium tension transformer VHT/MT.

A pump P driven by a motor M serves to raise water from the lower level to the higher level. The motor is powered by the grid via the transformer VHT/MT. Circuit breakers D1 and D2 enable the machines to be isolated and serve to switch between one type of operation and the other. A circuit breaker DTHT isolates the station from the high tension grid. T1 and T2 designate take-off transformers for feeding the thyristors that excite the motor and the alternator.

As explained above, switching from one type of operation to the other requires the circuit breaker DTHT to be opened, such that the transformer VHT/MT is frequently subjected to being put under tension while under no load, with the consequent risk of surge current.

Figure 2:
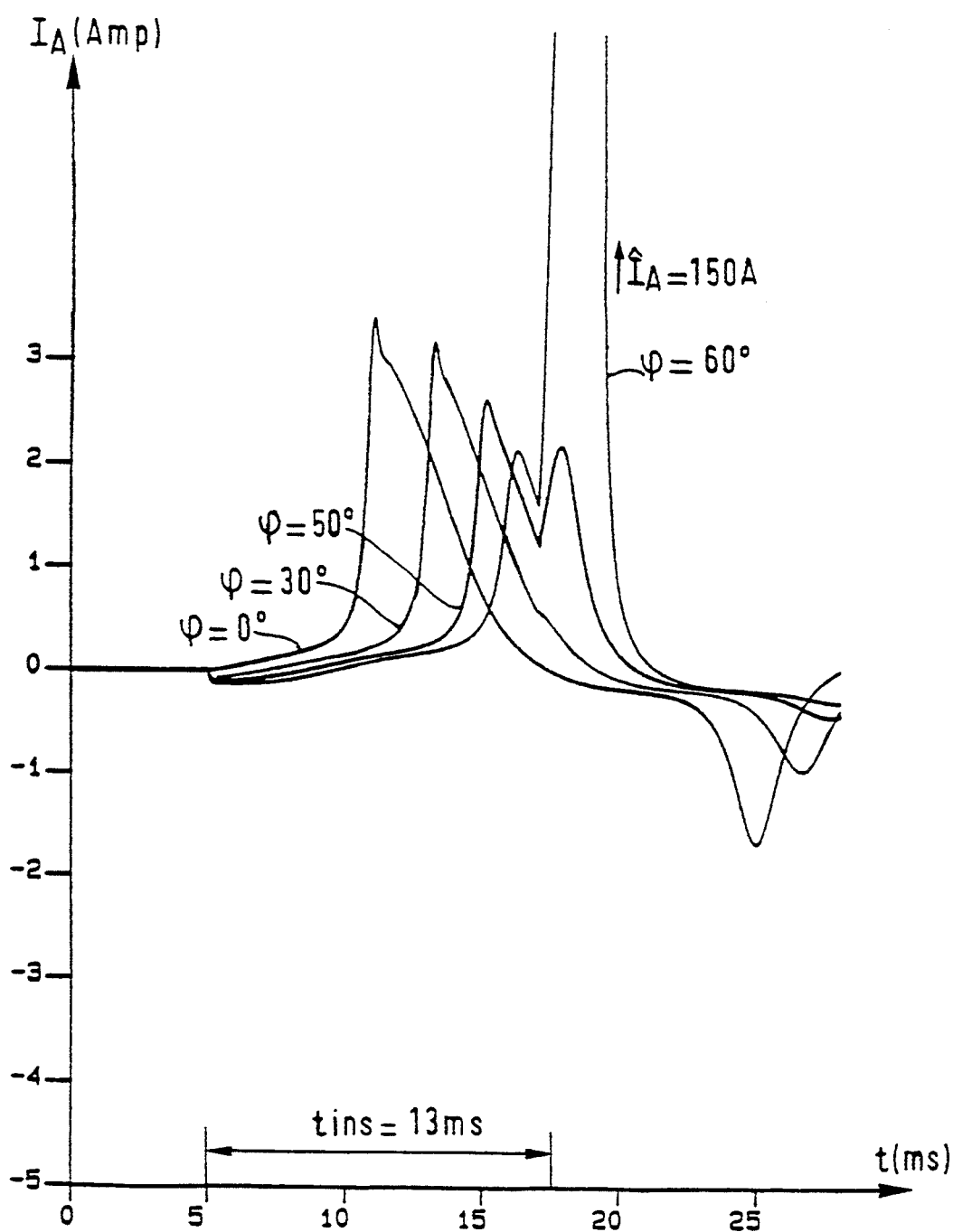
FIG. 2 is a graph showing the appearance of the surge current when inserting a resistance of 100,000 ohms for 13 milliseconds, and for various different phase values of the voltage at the instant the circuit breaker closes.

As shown in FIG. 2, it is known to limit the surge by using an engagement resistor at the terminals of the circuit breaker DTHT for a period of 13 milliseconds. It is observed that at certain values of the phase $\Phi$ of the voltage when the circuit breaker closes, the surge current IA reaches a peak value ÎA that is not acceptable. As can be seen in the graph, once $\Phi$ reaches 60°, the current ÎA reaches 150 A, and the following values have been found for ÎA at greater phase angles:

$$\Phi = 65° \quad \hat{I}A = 300A$$

$$\Phi = 70° \quad \hat{I}A = 400A$$

$$\Phi = 70° \quad \hat{I}A = 130A$$

Figure 3:
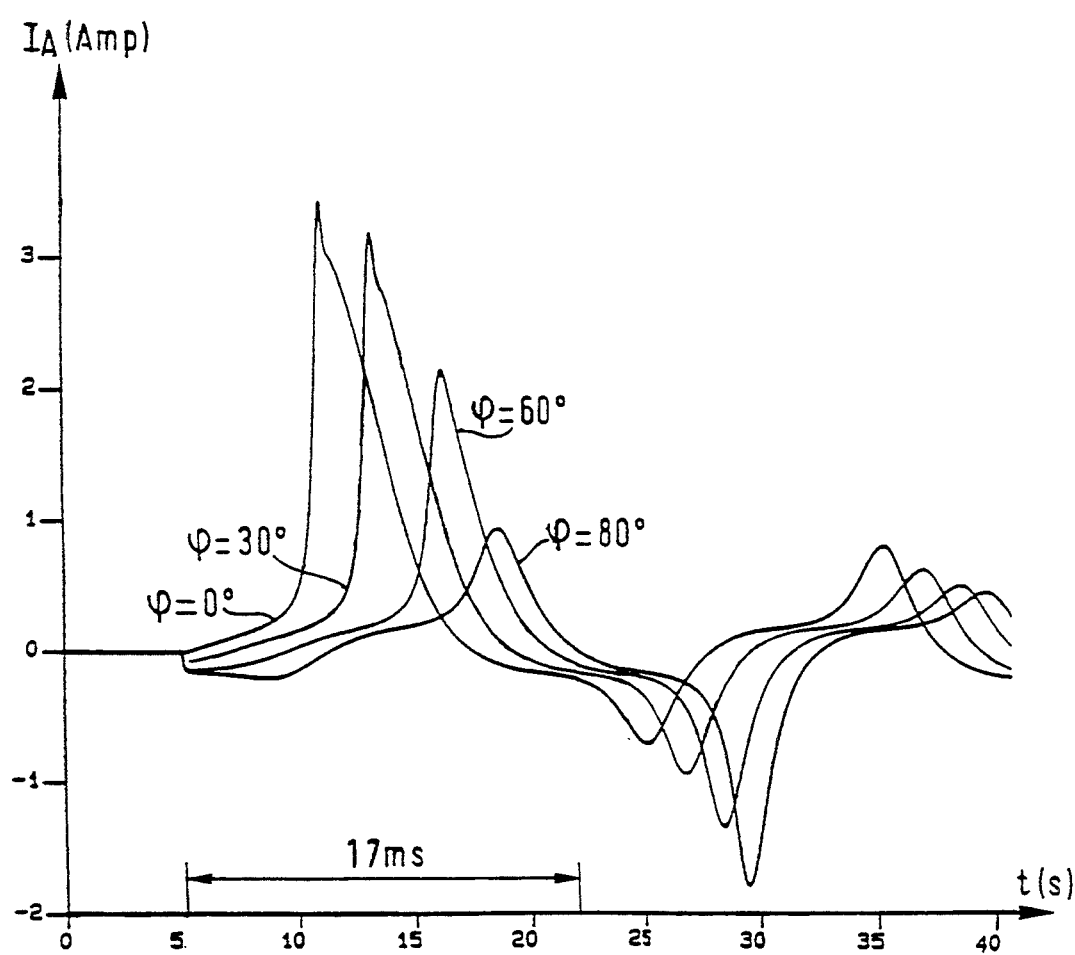
FIG. 3 is a graph analogous to FIG. 2 for an insertion period of 17 milliseconds.

According to the invention, and as shown in the graph of FIG. 3, an insertion duration of 17 milliseconds completely solves the problem since over the entire range of possible phase values, the peak current ÎA does not exceed a few amps. The energy absorbed by the closure resistance remains low, of the order of a few hundreds of Joules. In practice, the insertion duration is selected to lie in the range 15 milliseconds to 19 milliseconds.

It is well known how to perform the insertion technique. For example, reference may be made to the teaching of French patent No. 79 05 478 filed on Mar. 2, 1978, in the name of Delle-Alsthom. The closure resistance may either be inside the interrupting chamber of the circuit breaker DTHT, or else it may be in a separate column.

Another way of limiting surge currents in the transformer and which can be used on its own or in combination with the preceding technique, is to fit the pumping station with means MY that act on the control C of the circuit breaker so as to allow it to close only at an instant that is no more than 1.2 milliseconds on either side of the instant at which the grid voltage passes through an extreme value.

As a result, the current through the transformer cannot exceed twice its nominal current In, as has been shown by simulation calculations performed by the Applicant.

Figure 4:
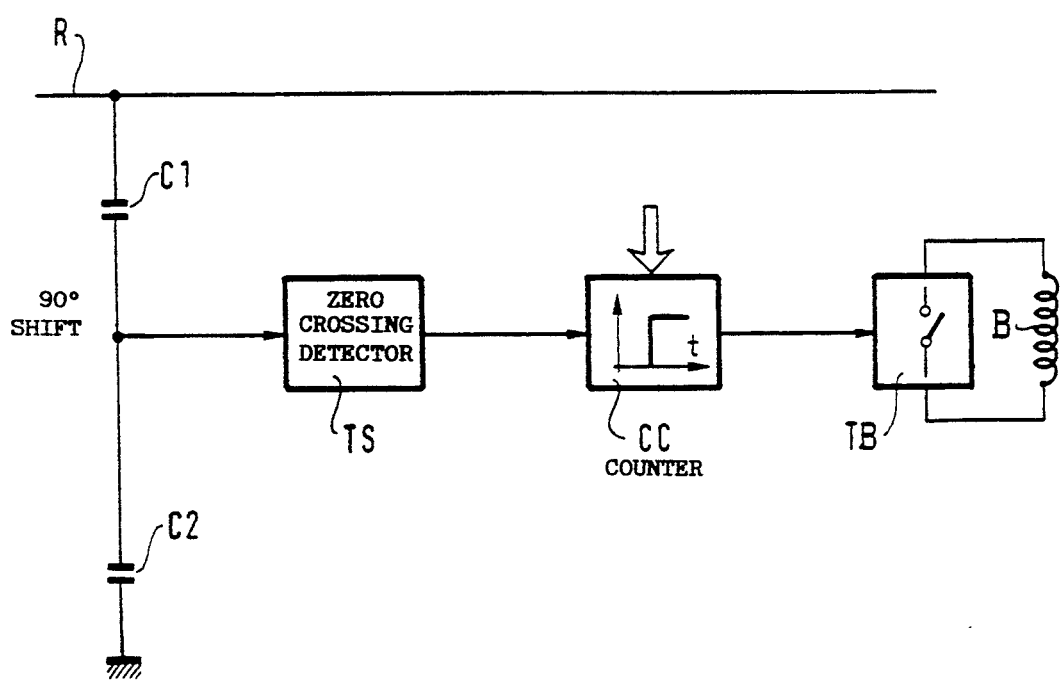
FIG. 4 is a block diagram of a circuit breaker control device.

FIG. 4 shows one embodiment of the above-outlined means: the means MY comprise a capacitive divider C1–C2 providing an image of the grid voltage but shifted by 90°.

This image voltage is applied to a zero crossing detector TS such as a Schmidt trigger, whose output is connected to a counter CC (e.g. a millisecond timer). The counter is adjustable and is set to provide an output control pulse after an adjustable time delay which takes account of the following:

a) the time required by the circuit breaker to operate (the time which elapses between the instant at which the close instruction is given and the instant at which the contacts of the circuit breaker touch each other: this time is about 50 milliseconds to 60 milliseconds, depending on the type of apparatus);

b) mechanical dispersion, which is of the order of 1 millisecond; and c) pre-strike time which is of the order of 1 millisecond to 2 milliseconds, depending on the type of circuit breaker.

At the output from the counter, a pulse controls operation of the switch TB in series with the trigger coil B of the circuit breaker.

Figure 5:
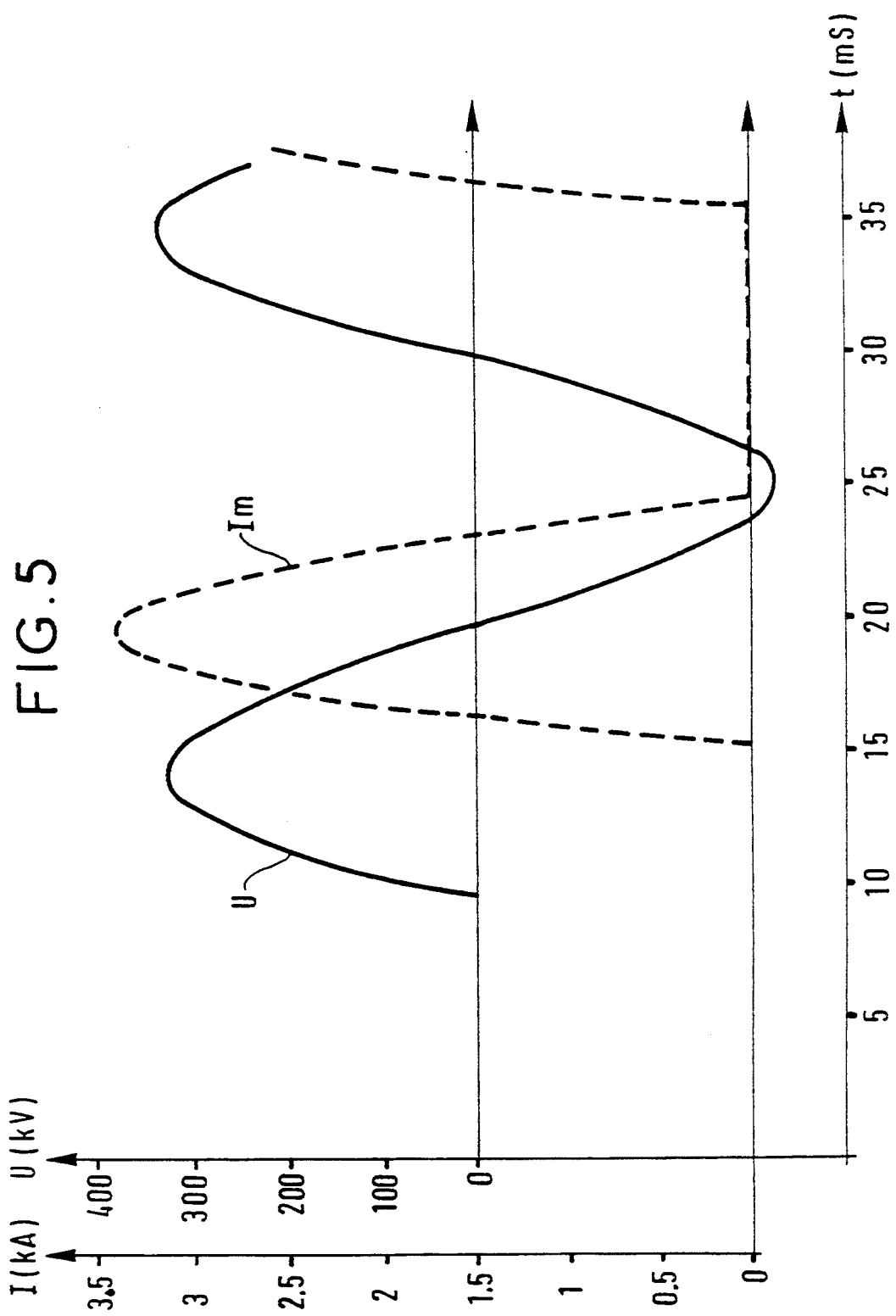
FIG. 5 is a graph showing the surge current through the transformer when the circuit breaker is engaged at grid voltage zero.

The graph of FIG. 5 shows that if the circuit breaker is closed when the grid voltage U is zero, then the surge current Im reaches a value equal to six times the nominal current In (500 A in the example shown) of the transformer.

Figure 6:
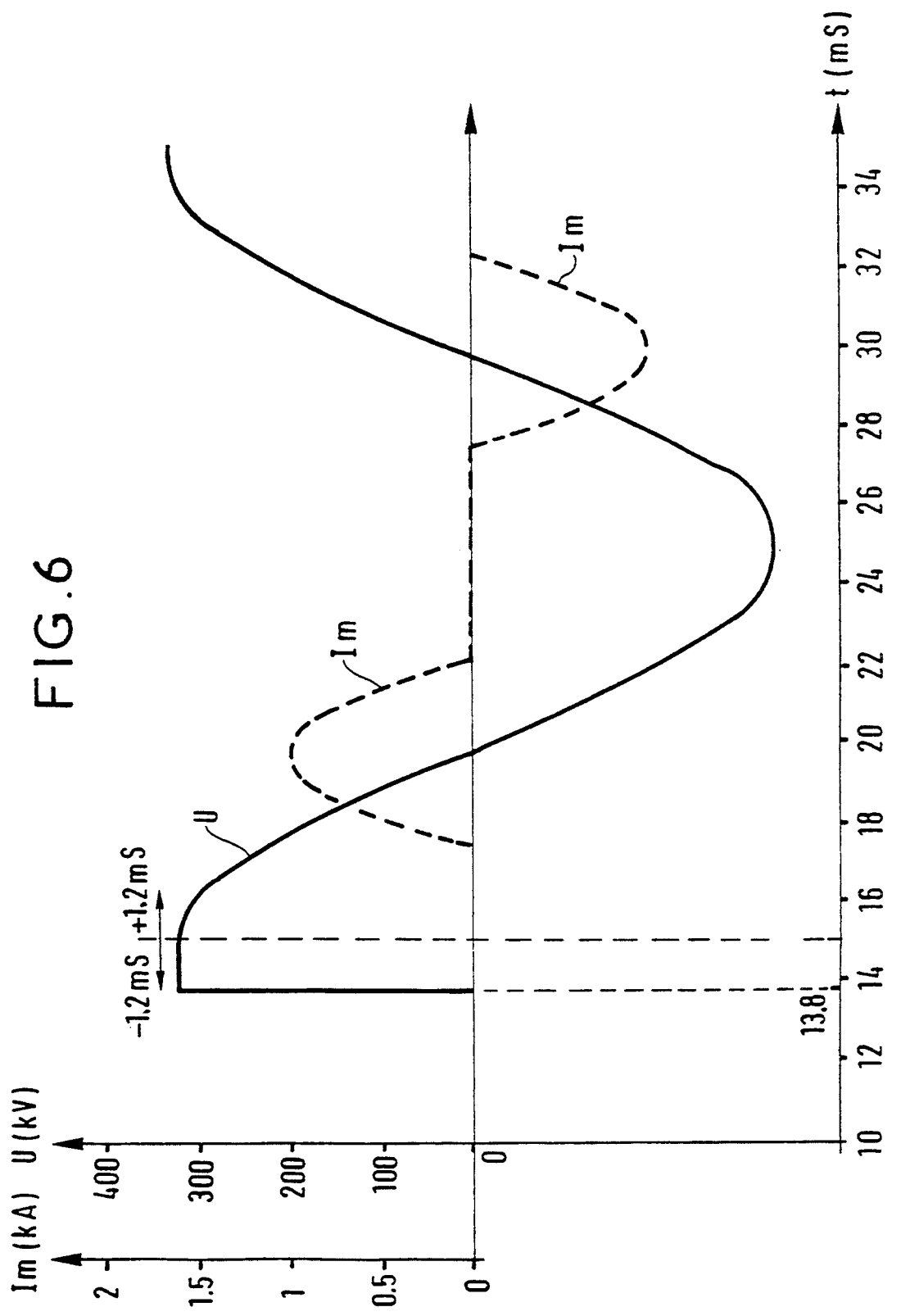
FIG. 6 is a graph showing the surge current through the transformer when the circuit breaker is engaged at an instant that is no more than 1.2 milliseconds away from an extreme value in the grid voltage.

The graph of FIG. 6 shows that by closing the circuit breaker within not more than 1.2 milliseconds (before or after) an extreme value of the grid voltage U, the peak of the current surge Im does not exceed twice the nominal current of the transformer, and this is quite acceptable for the transformer, even when it is switched several times a day.

This solution may present a risk since the maximum voltage wave is applied to the transformer. High amplitude voltage oscillations at a frequency of several MHz and having steep wave fronts appear in the components of the station, and this is harmful to the transformer.

Figure 7:
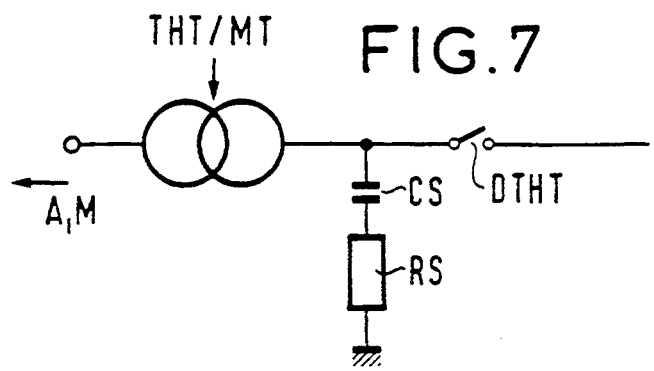
FIG. 7 is a diagram showing the use of a circuit comprising a resistor and a capacitor in series.

To avoid this drawback, each of the phase conductors connecting the transformer VHT/MT to the circuit breaker DTHT is grounded, as shown in FIG. 7, via a circuit comprising a capacitor CS and a resistor RS connected in series.

A practical implementation of this circuit is described below for a pumping station implemented using metal-clad technology, i.e. of the type having a metal envelope that is connected to ground. This example is not limiting.

Figure 8:
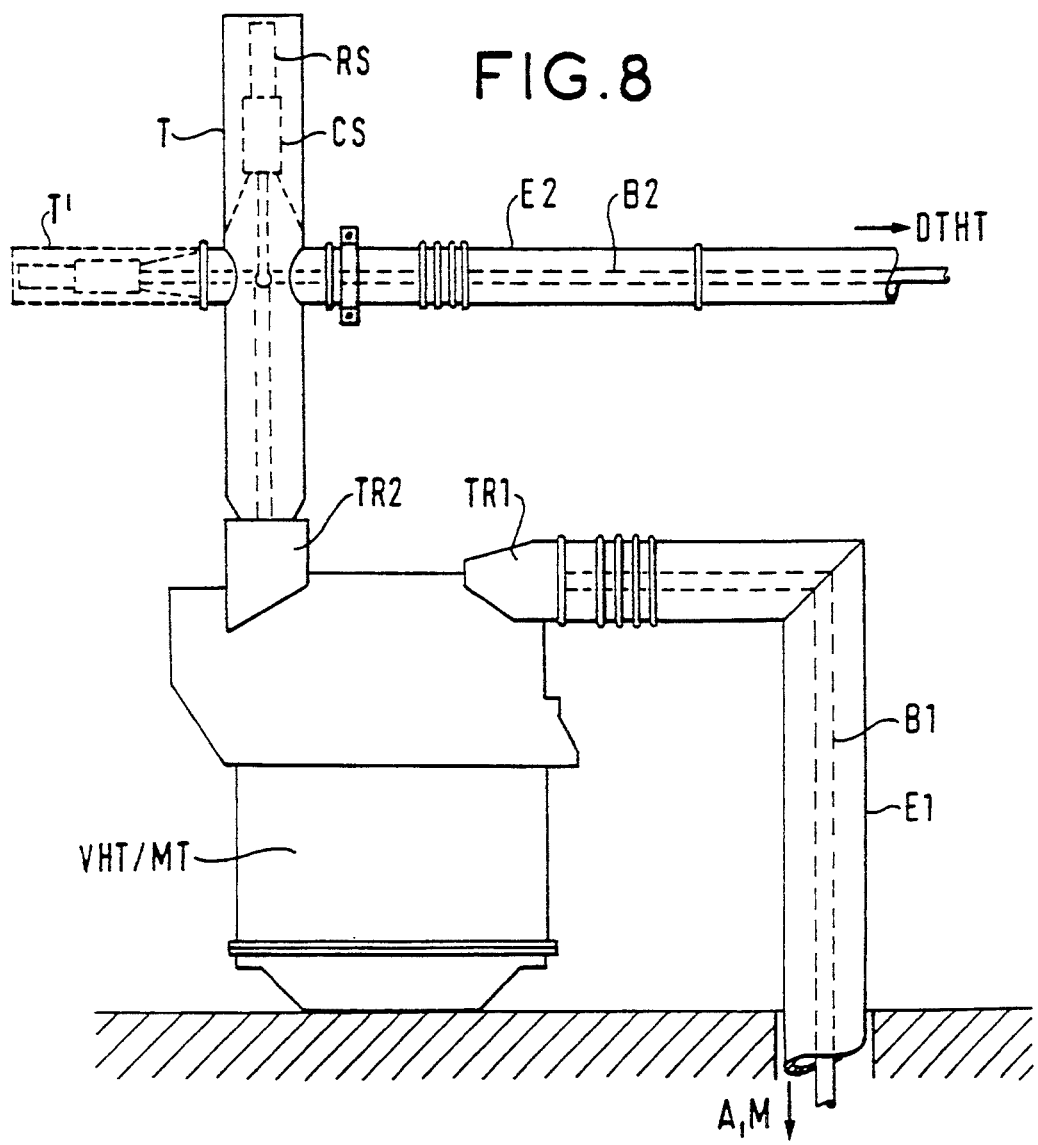
FIG. 8 is a diagrammatic elevation view of a portion of a pumping station implemented using metal cladding techniques.

FIG. 8 shows the transformer VHT/MT in elevation. Its medium tension side is connected to the alternator via a feedthrough TR1 connected to a first set of bus bars B1 placed in respective grounded metal envelopes E1 filled with gas having good dielectric properties, such as sulfur hexafluoride SF6.

The very high tension side of the transformer VHT/MT is connected to the circuit breaker via a feedthrough TR2 which is connected to a second set of bus bars B2 placed in respective grounded metal envelopes E2 filled with SF$_6$. The envelopes E2 form a bend to allow the set of bus bars B2 to extend horizontally before reaching the circuit breaker DTHT.

In a variant, the transformer could be fitted with conventional feedthroughs.

For each of the phases of the installation, the circuit of the invention comprises a resistor RS in series with a capacitor CS placed in a tube T disposed vertically in line with the feedthrough TR2 or in a tube T' disposed horizontally.

Figure 9:
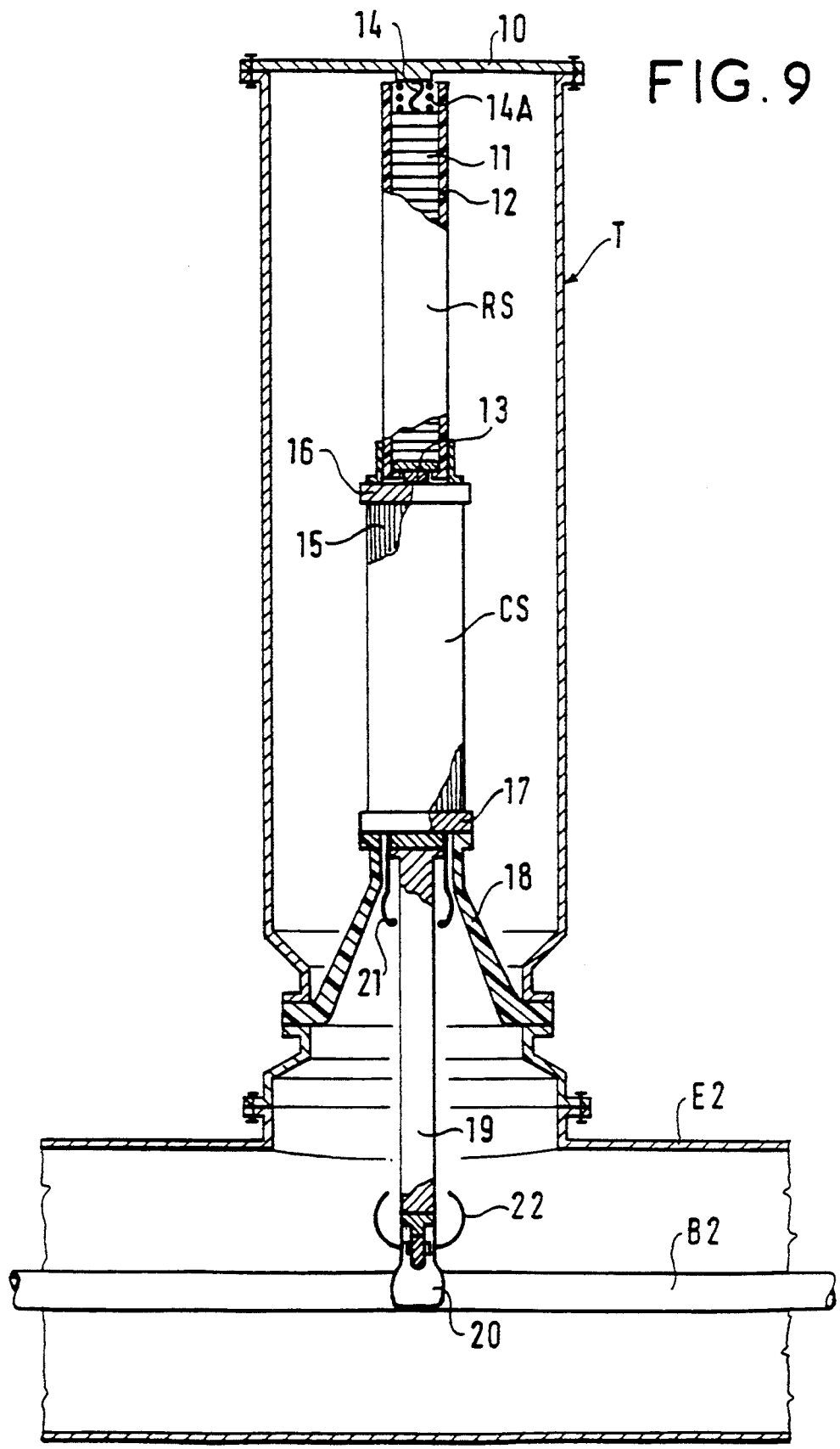
FIG. 9 is an axial section through a circuit including a capacitor and a resistor contained in a metal tube.

FIG. 9 is an axial section through the tube T containing the resistor RS and the capacitor CS. The tube T is filled with dielectric gas, preferably of the same kind and at the same pressure as the gas in the envelope E2 on which it is fixed. The tube T is closed by a gastight cover 10. The resistor RS is preferably constituted by a stack of pellets 11 placed in an insulating envelope 12. At one end, the envelope is fixed to a metal part 13 in contact firstly with the stack of resistive pellets and secondly with a terminal 16 of the capacitor CS. Electrical contact between the stack of pellets 11 and the cover 10 is provided by a metal braid 14 associated with a spring 14A.

By way of example, the capacitor CS may be constituted by a rolled-up sheet of metal-coated plastic 15. In a variant, the capacitor is a ceramic capacitor. The capacitor has two metal terminals 16 and 17, the terminal 16 is in contact with the resistor RS as mentioned above, while the terminal 17 is in contact firstly with an insulating cone that supports the circuit CS-RS inside the tube T, and secondly with a connecting bus bar 19 provided with a jaw 20 that provides connection with the associated bus bar B2. The device also includes anti-corona caps 21 and 22.

In this embodiment, a resistor is used whose resistance is equal to the characteristic impedance of the tube T. By way of example, in an installation having a 15 kV/420 kV transformer, the tube T has a diameter of about 750 mm and a length close to 2500 mm. The characteristic impedance of the tube is about 70Ω for a metal-clad station, so 70Ω is the resistance selected for the resistor RS.

It may be observed that the relative disposition of the resistor RS and of the capacitor CS inside the tube could be interchanged, i.e. the resistor could be connected to the bus bar 19 while the capacitor is connected to the cover 10.

Figure 10:
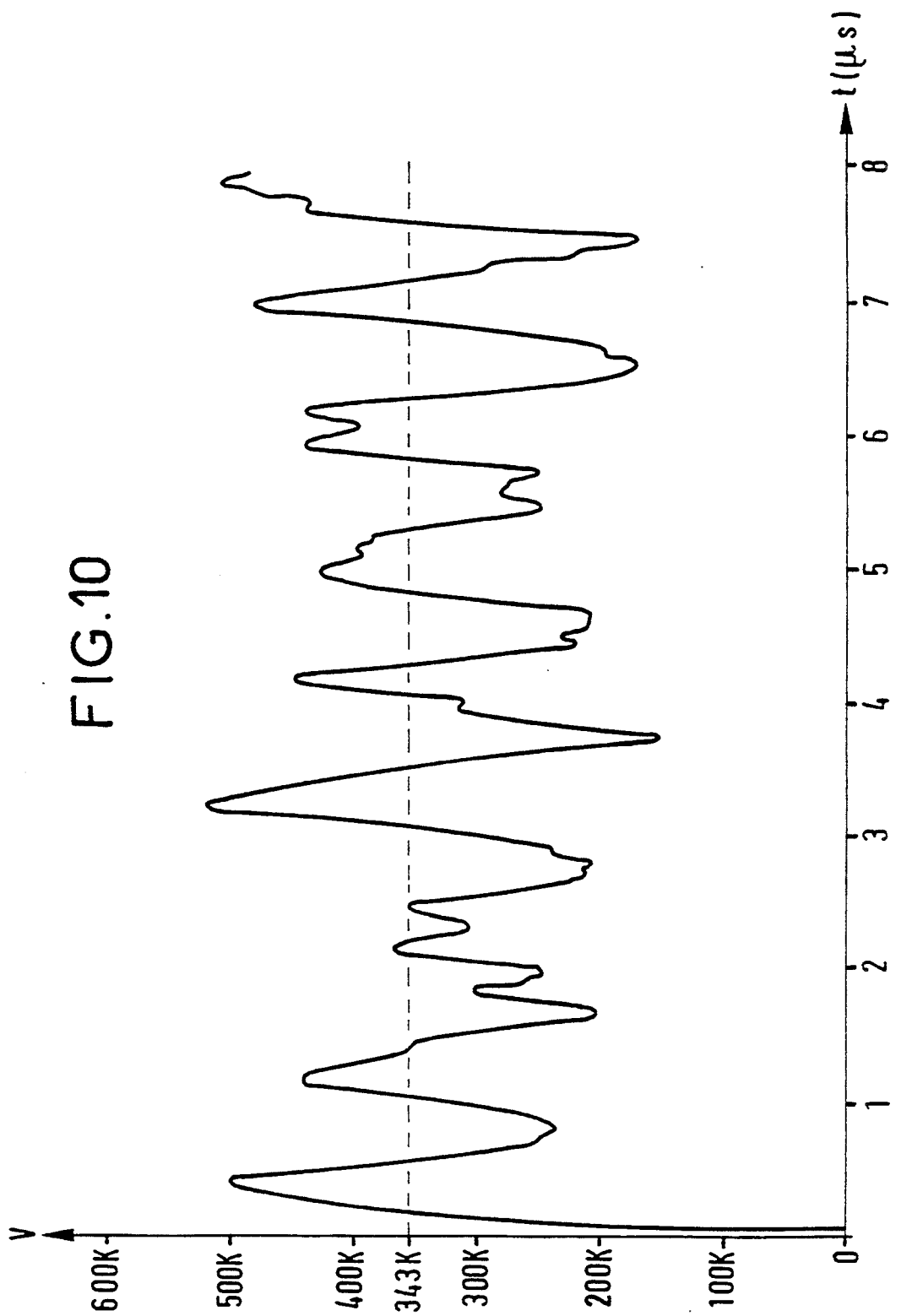
FIG. 10 is a graph showing the voltage across the terminals of the transformer in a pumping station in the absence of the resistor and capacitor circuit.

The graphs of FIGS. 10 and 11 show the effectiveness of the invention.

FIG. 10 shows variations in the voltage across the terminals of the high tension winding V of a 420 kV transformer (whose peak voltage value is 343 kV) varies when the maximum voltage Un of the grid is applied without using the circuit RS-CS of the invention. It can be seen that oscillations occur having steep wave fronts and at an amplitude that may be as much as 150% of the peak value.

In the graph of FIG. 11 which shows the same transformer being put under tension but in a station fitted with a circuit RS-CS of the invention, it can be seen that the oscillations are highly damped and that their amplitude is greatly reduced.

The invention is not limited to the embodiment described which is given purely by way of example.

The invention is applicable to pumping stations.

We claim:

1. In a pumping station that operates from time to time as a producer of energy by the action of a turbine driven by water falling from a higher level to a lower level, said turbine being coupled to an alternator connected to an electric network via a very high voltage/medium voltage transformer having phase conductors connected in series with a high voltage circuit breaker, and from time to time as a consumer of energy raising water from the lower level to the higher level by means of a pump driven by an electric motor fed from said electric network via said transformer, said high voltage circuit breaker being disposed between said transformer and said electric network and being fitted with a device for inserting a resistor on closing, the improvement wherein said resistor has an ohmic value in the range 500 ohms to 100,000 ohms, the duration for which said resistor is inserted on closing of the circuit breaker lying in the range of 15 milliseconds to 19 milliseconds, and wherein the station includes means acting on the control of the circuit breaker to allow it to close only a time not more than 1.2 milliseconds on either side of an instant that the electric network voltage passes through an extreme value, and wherein each of the phase conductors connecting the transformer to the circuit breaker being connected to ground via a circuit comprising a capacitor and a resistor in series.

2. A pumping station according to claim 1, wherein the capacitance of the capacitor is not less than 2 nanoFarads.

3. A commutator circuit inserted in a power station having a first part which operates as a producer of energy and a second part which operates as a consumer of energy, said commutator circuit operable to alternatingly connect said first and second parts to an electrical network and comprising:
   a. a very high voltage/medium voltage transformer alternatingly coupled to said first and second part;
   b. a high voltage circuit breaker connected in series between said transformer and said electrical network and having a resistor of an Ohmic range 500–100K Ohms and configured to be inserted for a duration of 15–19 milliseconds upon closing of the breaker;
   c. timing means configured to allow said closing of the breaker to occur only at a time not more than 1.2 milliseconds prior or subsequent to an instant that the electrical network voltage passes through an extreme value.

* * * * *